July 12, 1966  G. SCHOLLER  3,260,345
BUCKET WHEEL BOOM WITH MOVABLE CONVEYOR BELT
Filed Jan. 29, 1964  3 Sheets-Sheet 1

INVENTOR
Gerhart Scholler

BY Bailey, Stephens & Huettig
ATTORNEYS

July 12, 1966   G. SCHOLLER   3,260,345
BUCKET WHEEL BOOM WITH MOVABLE CONVEYOR BELT
Filed Jan. 29, 1964   3 Sheets-Sheet 3
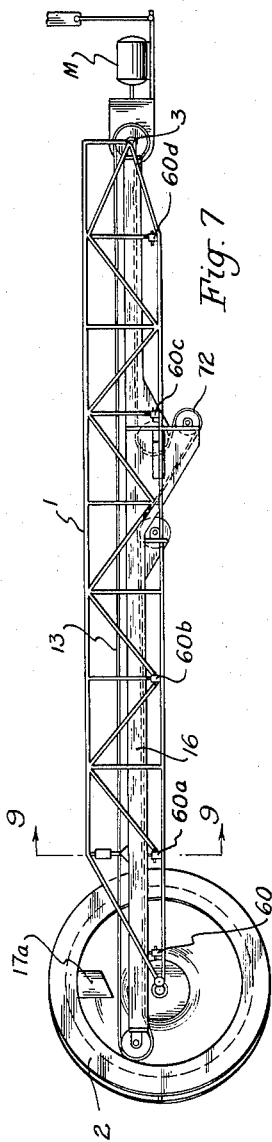
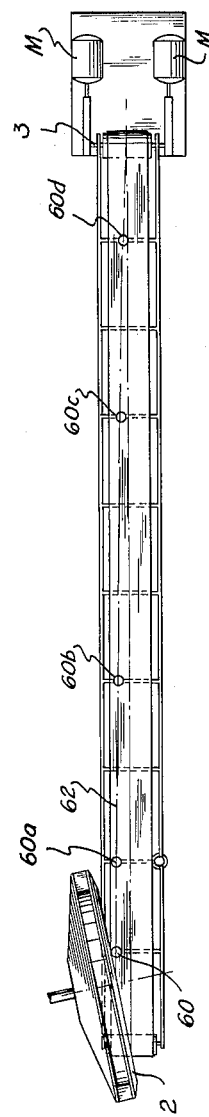
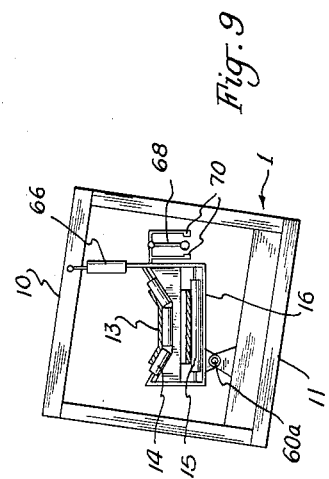
INVENTOR
Gerhart Scholler
BY Bailey, Stephens and Huettig
ATTORNEYS

United States Patent Office

3,260,345
Patented July 12, 1966

3,260,345
BUCKET WHEEL BOOM WITH MOVABLE
CONVEYOR BELT
Gerhart Scholler, Bad Schwartau, Germany, assignor to
Orenstein-Koppel und Lubecker Maschinenbau AG.,
Lubeck, Germany
Filed Jan. 29, 1964, Ser. No. 340,867
Claims priority, application Germany, Feb. 7, 1963,
O 9,224
17 Claims. (Cl. 198—9)

There are known bucket wheel diggers which are provided with a bucket wheel at the forward end of the bucket wheel boom. The material that is dug up with or by the bucket wheel is dumped onto the conveyor belt which is arranged in the bucket wheel boom, and the conveyor belt carries the material to the main frame structure of the digger and dumps it onto the end of the conveyor belt. Generally, the upper structure of a bucket wheel digger, to which the rear or discharge end of the bucket wheel boom is positioned, is displaceable or movable around a vertical axis, whereby the matter that is being dug up—the dirt—is dumped on a further conveyor belt which, in turn, delivers it to other conveyor belts, dump trucks, or the like. The movable main frame structure of the bucket wheel digger is supported on a lower structure that runs on caterpillar treads.

The known machines have the disadvantage that, on an inclined terrain, the surface of the conveyor belt is also inclined with regard to the horizontal plane, if the conveyor belt does not, by chance, run in the direction of the slope of the surface of the terrain. Conveyor belts that are inclined toward the side, however, have the disadvantage that the belts run off the rollers and drums. In order to eliminate this inclination, it is known to support the main frame structure in such a manner that it can be tilted with regard to the lower structure so that the platform of the main structure of the bucket wheel digger can be adjusted to a horizontal position. This, then, necessitates control devices that are both clumsy and difficult to adjust.

This invention avoids these disadvantages of the well-known bucket wheel digger. The invention is concerned with a bucket wheel boom including a conveyor belt. The invention further consists of the fact that the supporting rollers for the conveyor belt can be displaced or tilted around an axis running in the direction of the bucket wheel boom.

This invention has the advantage that the conveyor belt, when seen in cross-section, can be adjusted to a horizontal position with the aid of the supporting rollers of the conveyor belt that are arranged so that they can be tilted or displaced. In this case, the horizontal adjustment is understood to mean that in which the band reaches of the belt, when viewed in cross-section, lie in a horizontal plane. This arrangement of the conveyor belt avoids that the belt runs off the side ends of the rollers.

According to a further development of this invention, the forward drums, that is the ones of the feeding end of the conveyor belt, and/or the discharge drums of the belt, can be displaced or tilted in the same manner as the supporting rollers around an axis running in the direction of the bucket wheel boom.

Furthermore, it is advisable that the supporting rollers for the returning or lower reach of the conveyor belt are also arranged so that they can be displaced or tilted. A simple form of this construction consists in that the supporting rollers for the upper conveyor belt reach carrying the dirt and the supporting rollers for the lower return reach of the belt are swingable around the same axis. This assures the proper movement of the belt in all tilted positions, whereby the position of the belt with regard to the supporting rollers is also not changed by their tilted position.

A simple development of this invention consists in that several supporting rollers, lying behind one another, are arranged in a frame so that they can also be tilted or displaced. In this manner, there are formed sets of adjacent supporting rollers comprising several supporting rollers which can be swung out or tilted in unison.

In order to achieve a transfer, as even as possible, of the material to be conveyed from the bucket wheel and/or the discharge chute onto the conveyor belt, it is best that the swinging axis of the supporting rollers is positioned on the discharge chute side of the bucket wheel and, preferably, at the height of, or approximately the height of the lower end of the discharge chute. In this manner, the difference in the falling height of the material is held to a minimum during the varying tilted positions. Furthermore, it might be advisable to fasten the feeding chute, lying opposite the discharge chute, to the supporting rollers in a displaceable manner, preferably to the frame of the supporting rollers.

The supporting rollers, or rather sets of rollers, can be tilted in different ways. A simple construction consists in that the tilting mechanism for the sets of supporting rollers is a drive shaft running in the longitudinal direction of the boom and composed of segments connected by one or more universal joints. This results in a uniform displacement of all sets of supporting rollers.

The transfer of movement between the tilting mechanism and the displaceable sets of rollers can also take place in different ways. For example, a rack and gear arrangement composed of notches on the shaft of the tilting mechanism engaging segments of teeth or rods provided at the sets of supporting rollers is used. Another form of construction consists in that the drive shaft is provided with cams, whereby the largest difference of the radii of the curves corresponds to the maximum range of lift of the sets of rollers, with the rollers being supported on the cams or the like.

The supporting rollers, or rather sets of rollers however, can also be tilted by a device which consists essentially of wedge-like supports lying in the direction of the conveyor belt and also displaceable in that direction. In this instance, every supporting roller, or rather set of rollers, rests at one or several points on one or several of these wedge-like supports by way of a bearing element. The supports in turn are connected with one another through a push-pull rod drive, screw drive, or the like. In the last instance, the wedge-like supports are mounted on a continuous screw and are prevented from turning around the axis of the screw by means of guide pieces. The wedge-like supports are displaced in the direction of the bucket wheel boom when the screw is turned. Irrespective of the manner in which the wedge-like suports are driven, when moving them in the longitudinal direction of the bucket wheel boom, a displacement of the supporting rollers is achieved, or rather sets of rollers, which are supported by and glide on the wedge-like supports. In a further modification for the displacement of the supporting rollers, or rather sets of rollers, the latter are positioned on circular supporting devices which, in turn, are supported on rollers whose axes lie in the longitudinal direction of the boom.

The drive mechanism for the displacement of the sets of supporting rollers is controlled in different ways; for example, it can be steered manually by the driver of the digger, and corresponding to the adjustments of the digger. In order to simplify this, it is preferred to provide the drive mechanism for the sets of supporting rollers with an automatic steering device which adjusts the sets of supporting rollers so that they are always in a horizontal plane. In this instance, the steering device is a pendulum which is positioned in such a manner that it is displaceable at an angle to the longitudinal direction of the boom. In this form of construction, the conveyor belt is at all times, and completely automatically, brought into a horizontal position.

Another form of construction consists in that the steering device is coupled with the displacement mechanism. In this case, the adjustment of the conveyor belt takes place at the same time as the displacement of the upper or main frame structure of the machine.

In order to assure a faultless transfer of the conveyed material at the point where it is dumped onto the following conveyor belt, the following conveyor belt is arranged below the discharge belt of the bucket wheel boom, and also any other conveyor belts are positioned in the same manner as the conveyor belt of the boom, that is displaceable around an axis running in the longitudinal direction of the boom, and at least displaceable at the transfer point in a direction diagonal to the conveyor belt.

The means by which the objects of the invention are obtained are disclosed more fully with reference to the accompanying schematic drawings in which:

FIGURE 7 is a front view of a modified form of the conveyor boom;

FIGURE 8 is a plan view of FIGURE 7; and

FIGURE 9 is a cross-sectional view taken on the line 9—9 of FIGURE 7.

Figure 1:
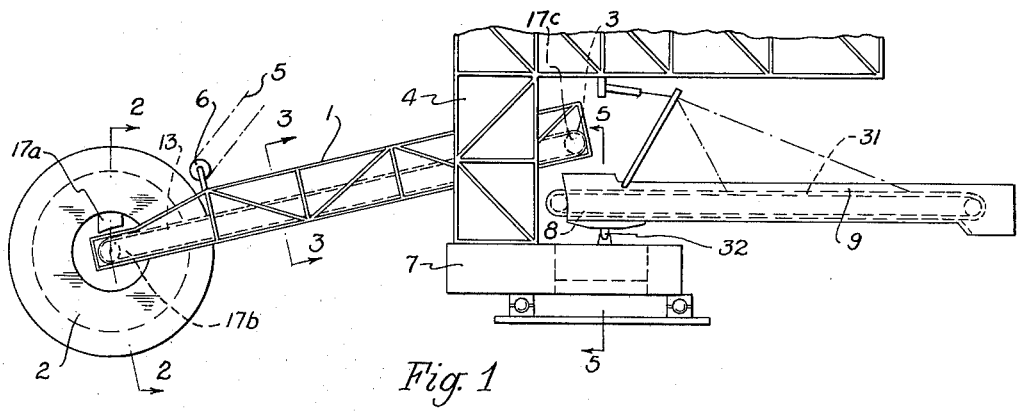
FIGURE 1 is a front view of a bucket wheel digger including the digging wheel boom and conveyor belts.
Figure 2:
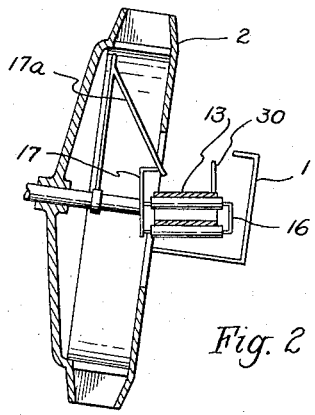
FIGURE 2 is a cross-sectional view taken on the line 2—2 of FIGURE 1.
Figure 3:
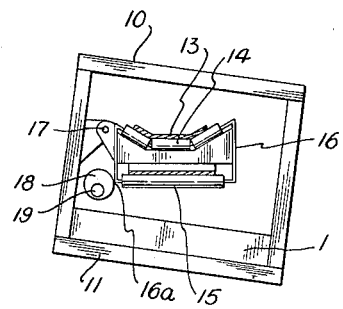
FIGURE 3 is a cross-sectional view taken on the line 3—3 of FIGURE 1.

As shown in FIGURES 1, 2 and 3, the bucket wheel boom 1 extends between the bucket wheel 2 and a pivot pin 3 fastened to the upper main frame 4 of the digger, which is not entirely shown. The boom 1 is hung from ropes 5 which extend around a sheave 6 secured to the boom.

The main frame also has a platform 7 which supports the forward end 8 of a frame 9 carrying a following conveyor. The boom 1 has an upper surface 10 and a lower surface 11, shown in FIGURES 2 and 3 as being inclined from the horizontal. Likewise, the bucket wheel 2 in FIGURE 2 is inclined from the vertical.

Boom 1 holds the boom conveyor belt having an upper reach 13. In the absence of this invention, when the boom 1 is inclined transversely or sidewise, as shown in FIGURES 2 and 3, then the upper reach 13 would also be inclined. This has the disadvantage in that the conveyor belt will then slide off to one side and rub against the boom. According to this invention, the supporting rollers 14 for the upper reach of the belt and the supporting rollers 15 for the lower reach of the belt are mounted in a frame 16 which is pivotable around an axis 17 parallel to the longitudinal axis of boom 1. Wheel 2 has a chute 17a to discharge material from the buckets outwardly to one side of the wheel. The axis 17 lies adjacent the lower end of chute 17a on the same side of wheel 2. The belt drum 17b at the loading end of the upper reach 13 of the boom conveyor belt is likewise pivotable around an axis which is an elongation of axis 17. Because the boom belt and its drum 17b are held by frame 16 which is pivotable above axis 17 when the boom is tilted and the belt held horizontal, there is very little relative change in the distance between the lower edge of chute 17a and upper belt reach 13. This means that the free fall of the material from the chute 17a onto the boom belt changes very little upon inclination of wheel 2.

The discharge end belt drum 17b is tiltable in the same manner as are rollers 14 and 15. Also, this drum is tiltable about an axis parallel to the axis 17. Consequently, all rollers carrying upper reach belt 13 are pivoted around the same axis so that the position of the belt with respect to the rollers and drums is not changed.

Various means can be used for pivoting frame 16 around axis 17, which is actually a hinge shaft. As schematically shown in FIGURE 3, an eccentric circular disc or cam 18 is fixed to a drive shaft 19. This drive shaft extends the entire length of boom 1 and is composed of segments connected to each other by universal joints. Frame 16 has an edge for slide plate 16a which engages the cam surface of disc 18. When disc 18 is turned downwardly by the rotation of shaft 19, the frame 16 is caused to pivot about axis 17 so as to be maintained horizontal. Frame 16 can also be tilted by means of gear trains or racks and gears which are mounted between frame 16 and drive shaft 19. Hydraulic means can also be used.

Figure 4:
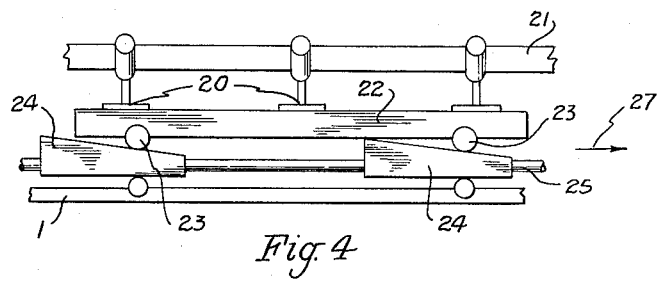
FIGURE 4 is a side view of a modified form of the invention.

As shown in FIGURE 4, the boom conveyor belt can be pivoted about its axis by using a wedge system. There are always sets of three supporting rollers 20 for the conveyor belt 21 and secured to a beam 22 parallel to belt 21. The belt is pivotable about an axis corresponding to the axis 17 of FIGURE 3. Beam 22 rides upon slide element 23 and these slide elements bear against wedge members 24. These wedge members extend in the longitudinal direction of boom 1 and are joined by a push-pull rod 23. Consequently, for example, when the wedge members are pulled in the direction of the arrow 27, the beam 22 is forced upward so that the belt 21 is pivoted around its axis.

Frame 16, FIGURE 2, also carries at its loading end a material catch board 30 for preventing the material falling off chute 17a from jumping off the upper belt reach 13. Thus this board is always kept at its optimum angle by being tiltable with frame 16.

Figure 5:
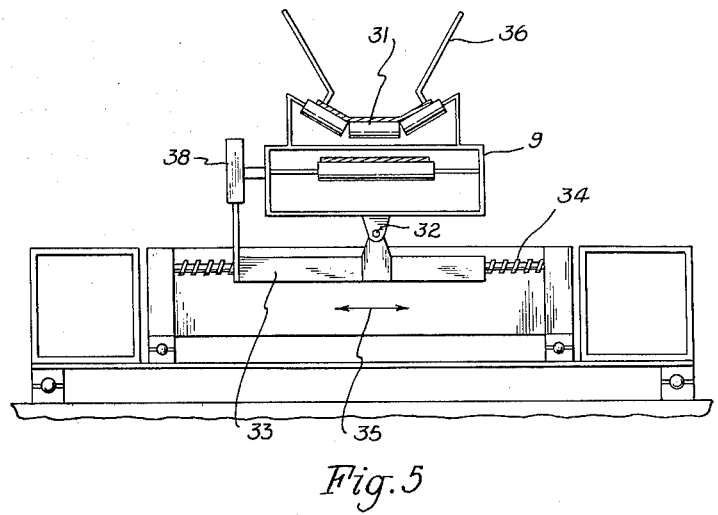
FIGURE 5 is a cross-sectional view taken on the line 5—5 of FIGURE 1.

As shown in FIGURES 1 and 5, the frame 9 contains a following conveyor 31 which receives material dumped from upper belt reach 31. This belt 31 is also displaceable as is upper reach 13 so that it can be maintained, as seen in cross-section, in a horizontal position despite inclinations of the digger frame. As shown, the entire frame 9 is supported on a pivot pin 32 having its axis parallel to the axis of boom 1. In this construction, the belt 31 cannot be pivoted with respect to its frame 9. Pivot pin 32 is supported on a worm bushing 33 which travels on a screw 34. Therefore, pin 32 can be shifted either way as indicated by the double arrow 35 so that the receiving end of belt 31 is adjustable so as to be centered below the discharge end of upper belt reach 13 in any position of the boom 1. The receiving chute 36 is secured to frame 9 so that it is likewise centered along with belt 31.

Any suitable drive means can be used to pivot frame 9 around pin 32. For example, this can be a hydraulic jack 38.

Figure 6:
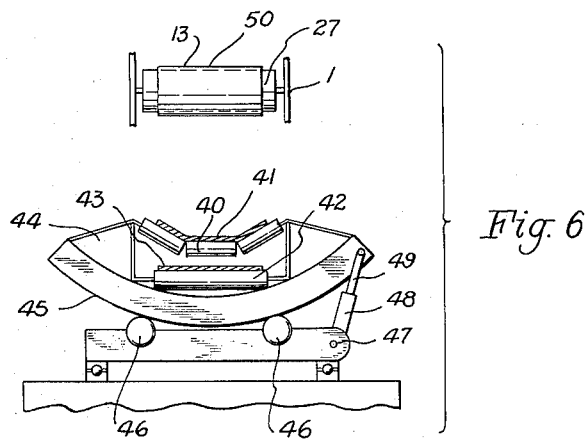
FIGURE 6 is another modified form of the invention.

FIGURE 6 shows a modified construction for supporting the rollers 40 of belt 41 which is similar to belt 31. Rollers 40 for the upper reach of the belt and rollers 42 for the lower reach 43 of the belt are mounted on a circularly curved rail 45. This rail rests on two rollers 46, the axes of which are parallel to the longitudinal axis of belt reach 41. The rollers 46 on one longitudinal side of the belt reaches are driven by a common drive shaft so as to move the rail 45 and incline the belt.

FIGURE 6 also shows another means for displacing rail 45. Fastened to frame 47 is a hydraulic cylinder 48 which operates a piston 49 connected to rail 45. It is clear that movement of the piston 49 will change the angular position of rail 45. The center of curvature of rail 45 lies at approximately the level of the discharge or dumping edge 50 of the upper reach 13 of the boom conveyor belt.

This modification has the advantage in that the conveyor belt reaches 41 and 43 can be simultaneously horizontally displaced and tilted so that the material will be received approximately in the middle of the upper reach of the belt.

A pendulum-operated mechanism is used to automatically adjust the belt into horizontal position. This pendulum swings transversely of the longitudinal axis of the belt or boom. By switching on and off electrical contacts, the drive mechanism for displacing the belt supporting frames are actuated. Hydraulic controls can be similarly actuated.

In the modification shown in FIGURES 7 to 9, the frame 16 is supported on a plurality of pivotable bearings 60a–d which are aligned on an axis 62 which runs at an acute angle to the longitudinal axis of frame 16. Bearing 60a lines along side of and adjacent the center point of bucket wheel 2, while bearing 60d lies adjacent the center line of frame 16 near the material discharge end of the conveyor belt.

The conveyor belt is driven by one or more motors M.

By reason of this arrangement, conveyor belt 13 can be maintained in a horizontal position while the bucket wheel 2 and boom are inclined from the vertical. The distance between the lower end of bucket wheel chute 17a and the upper reach of the conveyor belt changes very little, even when the boom 1 is severely tilted. Also, the discharge end of belt 13 is substantially always in the same position despite the tilting of the boom.

A hydraulic piston 66 is connected between the boom and frame 16. A single piston is sufficient to tilt the entire frame, although a plurality of pistons, as well as other driving means, could be used. The hydraulic system is preferred because of its simplicity.

The automatic adjustment device of FIGURE 9 is also applicable to tilting the frame 16 in FIGURES 1 and 3. This adjusting device is composed of a pendulum 68 which is hung between electrical contacts 70. When the boom is tilted, the pendulum will strike one or the other of contacts 70, thus activating an electric circuit to operate piston 66 and tilt frame 16 back to a horizontal position.

The lower reach of the belt is provided with a slack take-up mechanism 72 which is carried by the frame 16.

Having now described the means by which the objects of the invention are obtained, I claim:

1. In the combination of a bucket wheel digger boom with a bucket digger wheel and rollers carrying a boom conveyor belt mounted in said boom, the improvement comprising frame means mounting said rollers in said boom for pivotal movement about an axis extending in the general direction of the longitudinal axis of said boom to counteract for a sidewise tilt of the digger boom.

2. In the combination of claim 1, further comprising belt drums at the loading and discharge ends of said belt, and means mounting said drums in said boom for pivotal movement about said axis parallel to the longitudinal axis of said boom.

3. In the combination of claim 2, said digger wheel having a chute for discharging material coming from said wheel to one side of said wheel, and said axis lying adjacent the lower end of said chute.

4. In the combination of claim 3, further comprising a material catch board secured to the material loading end of said frame means and pivotal therewith about said axis.

5. In the combination of claim 4, further comprising a hinge shaft lying on said axis, said frame being hinged to said hinge shaft, a drive shaft mounted in said boom parallel to said hingeshaft and composed of segments connected by universal joints, and thrust means driven by said drive shaft and engaged with said frame for pivoting said frame about said hinge shaft.

6. In the combination of claim 5, said thrust means being comprised of a rack and gear.

7. In the combination of claim 5, said thrust means being composed of cams mounted on said drive shaft for pivoting said frame between its extreme positions.

8. In the combination of claim 4, further comprising a beam secured to said frame, and wedge means movable parallel to said axis and engaged with said beam for pivoting said frame about said axis.

9. In the combination of claim 4, further comprising thrust means engageable with said frame for pivoting said frame about said axis, and automatic control means for actuating said thrust means for holding said frame transversely horizontal upon a tilting of said boom from the vertical.

10. In the combination of claim 9, said control means comprising means responsive to a pendulum mounted for swinging transversely of said axis.

11. In the combination of claim 10, further comprising digger wheel driving means, and connecting means for driving said thrust means from said digger wheel driving means.

12. In the combination of claim 11, further comprising a following conveyor belt for receiving material from said boom conveyor belt, and means for tilting at least the material receiving end of said following belt about its longitudinal axis in accordance with the pivotal movement of said boom belt.

13. In the combination of claim 12, said tilting means for said following belt comprising a circularly curved rail extending transversely of and supporting said following belt, and said rail having a center of curvature lying approximately at the level of material discharge from said boom belt.

14. In the combination of claim 1, said mounting means for said rollers comprising a frame containing said rollers, and a plurality of aligned pivotal bearings supporting said frame in said boom.

15. In the combination of claim 14, further comprising hydraulic piston means between said frame and boom for pivoting said frame on said bearings.

16. In the combination of claim 15, said bearings being aligned obliquely of the longitudinal axis of said boom.

17. In the combination of claim 16, said bearings being positioned from adjacent the center of the bucket digger wheel to a point substantially on the center line of said frame at the discharge end of the conveyor belt.

References Cited by the Examiner
UNITED STATES PATENTS 1,311,621    7/1919    Rust _____ 198—9

EVON C. BLUNK, *Primary Examiner.*

WILLIAM B. LA BORDE, *Examiner.*